AMPLIFIER HAVING SERIES-CONNECTED OUTPUT TUBES

Original Filed March 21, 1952

2 Sheets-Sheet 1

INVENTOR.
Wallace H. Coulter
BY
J. Irving Silverman
Attorney

AMPLIFIER HAVING SERIES-CONNECTED OUTPUT TUBES

Original Filed March 21, 1952

2 Sheets-Sheet 2

INVENTOR.
Wallace H. Coulter
BY
I. Irving Silverman
Attorney

United States Patent Office 2,763,733

Patented Sept. 18, 1956

2,763,733

AMPLIFIER HAVING SERIES-CONNECTED OUTPUT TUBES

Wallace H. Coulter, Chicago, Ill.

Original application March 21, 1952, Serial No. 277,854, now Patent No. 2,743,321, dated April 24, 1956. Divided and this application October 25, 1954, Serial No. 464,437

4 Claims. (Cl. 179—171)

This invention relates generally to electronic amplifiers and more particularly is directed to an amplifier for driving low impedance loads by means of at least a pair of series-connected tubes.

This application relates to an improvement over the amplifier described and claimed in my co-pending application Serial No. 82,677 filed March 21, 1949 entitled Amplifier Circuit Having Series-Connected Tubes, now Patent No. 2,659,775. This application is a continuation-in-part of said co-pending application and a division of my co-pending application, Serial No. 277,854 filed March 21, 1952, now Patent No. 2,743,321 issued April 24, 1956.

Certain objects and advantages were referred to in connection with the invention set forth in said co-pending application, and all of said advantages and objects are achieved as well by the herein invention. In recapitulation, the degenerative action inherent in the top tube (that is to say, that tube whose plate is "free" and whose cathode is connected to the plate of the other tube, (often designated the "bottom" tube) of a series-connected pair is compensated for as an important achievement of the invention and all of the great advantages of substantially perfect push-pull output are available. The desideratum is the achievement of making the input to the top tube independent of the load so that as closely as possible identical signals equal and opposite in phase can be applied to the two tubes.

The output of the amplifier is adapted to feed, not only loads of low impedance (which in and of itself is a great advantage and economy) but also loads in which the impedance varies over a wide range. Certain expedients for compensating for the degeneration of the top tube (i. e., its dependence upon the load voltage) and described in said co-pending application are equally applicable to this invention, and it is to be understood that same may be substituted for circuitry shown in the alternative herein. In addition to the above, a novel manner of connecting the load is suitable for adaptation with either or both inventions, in which the amplifier not only may be operated Class A, but may also be operated Class AB or B without giving rise to significant distortion in the signal output.

The invention herein differs from that of the co-pending application in that circuits are used which are believed to be more economical, convenient and efficacious. Excellent push-pull balanced output results are obtained from the application of these circuits to the series-connected pair. Many of the phases of the invention herein are equally applicable and serve to render more efficient the circuit of the said co-pending application.

In both applications I have referred to degeneration occurring in the top tube of a series-connected pair by virtue of said top tube acting as a cathode follower. This degeneration is said to be compensated for or neutralized. The effect of this degeneration is that the input circuit of the top tube is tied in with the output so that it rides the load voltage. Obviously under these circumstances it is impossible to achieve substantially balanced inputs to the two tubes. Some method of countering this effect is intended by the so-called "compensation" or "neutralization," the net effect of which is intended to be the same. I utilize a voltage obtained from the load as a sort of "sensing" voltage and apply it in a manner to offset this degenerative effect. In the case that the voltage from the load, i. e., the sensing voltage is applied to the bottom tube of the series-connected pair, I call it compensation. In the case that the sensing voltage is applied to the top tube I call it neutralization. As stated, it is immaterial what the designation is, since the net result is the same. That result is the achievement of substantially independent input to the top tube, so that it can be adjusted independent of the load voltage and therefore can be made equal in amplitude and opposite in phase to the signal appearing at the input of the lower tube. The process of applying the sensing voltage to the top tube is that with which I am principally concerned in this application.

The exact nature of the electrical processes involved in applying a portion of the load voltage, i. e., a sensing voltage, to one or the other of the tubes to achieve the desired balance is not readily resolved through simple explanation. As a matter of fact, the theory by virtue of which I explain the same may not be actually correct in every respect, but it is not intended to be limited by such explanations which are only included herein to aid in an understanding of the structure by virtue of which the circuits operate successfully. The top tube must have a total voltage, i. e., including the signal, applied to its grid which has a definite relationship with the load voltage. The top tube cannot be hanging as an isolated element since obviously the output load voltage appears from the juncture between the two tubes and A. C. ground. The voltage derived from the load as a sensing voltage therefore establishes the required relationship between the top tube of the series-connected pair and the load. This will be more fully brought out hereinafter.

An important object of the invention lies in the provision of a circuit for an amplifier having a pair of series-connected tubes in which novel circuit means are provided for supplying a sensing voltage derived from the output to the top tube to achieve substantially balanced push-pull operation in driving a load. An important ancillary of this object is to provide such a means which is simple, economical and highly efficient in operation.

A further object of the invention is to provide a novel circuit whereby the grid of the top tube is driven in such a manner that the high voltage required to drive the same is easily obtained while at the same time the sensing voltage derived from the output and required by the top tube for providing substantially perfect balanced operation is being supplied thereto.

Still another object of the invention is to provide a novel amplifier circuit in which the top tube is supplied with a sensing voltage derived from the output of the series-connected pair to neutralize the degeneration thereof in obtaining substantially balanced push-pull output from the amplifier, and in which the tubes maybe screen grid tubes.

In connection with the object immediately above, the high plate circuit efficiency inherent in screen grid tubes is made available in this type of amplifier circuit having low output impedance in a manner which is highly economical and in keeping with the objectives of balanced push-pull operation. This phase of the invention has a wider range of application than immediately obvious and is applicable in the case of amplifiers of varied input circuitry.

A further object of the invention is to provide a novel circuit for feeding the screen grids of the tubes of a series-connected pair of tubes in the output section of the amplifier.

Another object of the invention is to provide an amplifier having series-connected tubes for providing a substantially balanced push-pull output and in which the top tube is supplied with a sensing voltage derived from the output to neutralize the degeneration thereof, said amplifier comprising a stage which has an output which drives the input circuit of the top tube of the series-connected pair in a manner such that the input to the top tube is independent of any voltage or impedance changes occurring in the output circuit.

Still a further object of the invention is to drive the input circuit of the top tube in a manner set forth in the object immediately above by connecting the voltage appearing across the output in series with the plate impedance element of said stage.

Still a further object of the invention is to provide an amplifier of the character described including a pair of series-connected screen grid tubes which is associated with a low impedance load including an electro-acoustical device having inductive elements and in which the said elements serve as means to enable efficient feeding of the grids of the said screen grid tubes.

In connection with the object immediately above, other objects are concerned with the provision of novel circuitry of different types for the efficient and economical feeding of the said screen grids. For example, the load may comprise two parts insulated one from the other insofar as D. C. is concerned and which can provide separate D. C. paths for the screen circuits. Such "split" loads could be speaker coils or recording galvanometer windings. In other examples, the load may comprise means for minimizing or substantially eliminating the effects of magnetizing currents while so feeding the screen grid circuits.

Many other objects and advantages will occur to those skilled in the art, and many salutary benefits are achieved through the use and application of the invention in different manners. Great economy and efficiency are achieved through the use of a minimum of easily obtained components, while not permitting the fidelity and response of the amplifier to suffer.

In compliance with the statutes, I have specifically described preferred embodiments of the invention and I have illustrated the same in some detail, but only diagrammatically, utilizing the conventional symbols well known for that purpose. It is desired to emphasize that such illustrations and explanation are not intended as a limitation on the invention, but are for the purpose of rendering lucid the exact and complete explanation of the nature of the advance I have made in the arts and sciences. Many modifications and variations are possible within the purview of the invention and without departing from the scope thereof.

Figure 1:
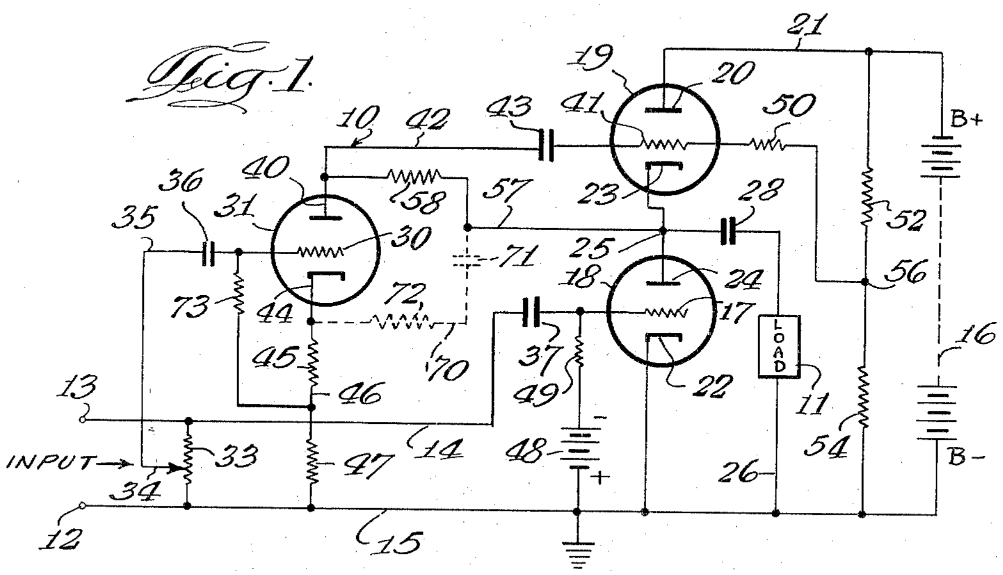
Fig. 1 is a circuit diagram of an amplifier constructed in accordance with my invention, and showing a simplified form thereof.

Referring now to the drawings, especially to Fig. 1, I have illustrated a somewhat simplified form of the invention comprising an amplifier 10 adapted to drive a load 11 indicated by a block. Said load may be resistive or inductive, and may be considered for example as the voice coil of a speaker. The input to the amplifier 10 may be derived from any suitable source such as for example a prior stage. The flexibility of the amplifier embodying the invention is quite great, and same may be considered as a high fidelity, broad band device, capable of supplying an output with excellent characteristics over a very wide frequency range.

The amplifier 10 comprises several parts which broadly can be referred to in generally describing the same. The input terminals at the left, designated 12 and 13 feed what I have termed the inverter or lifter portion while at the same time feeding the lower tube of the series-connected pair of tubes. The latter pair of tubes, together with output connections I term the output portion. The signal is inverted by the inverter and fed in opposed phase relation to the upper of the series-connected pair so that the output portion is properly driven to achieve the benefits of balanced output. In order to neutralize degeneration in the top tube of the series-connected pair, a sensing signal from the juncture between the tubes is fed through the plate resistor of the inverter section. The advantage of this type of neutralization over that described in the previous application is that by the arrangement generally referred to above, and more specifically pointed out below, the top tube of the series-connected pair is more easily and simply driven with the high amplitude signal that it requires. The signal for the top tube is lifted by the sensing signal so that its level is above that of the load and independent thereof.

Specifically, the terminals 12 and 13 feed the leads 14 and 15. Lead 15 is the common ground and it is the negative end of the B supply designated generally 16 on the right hand side of the circuit diagram. In certain instances the lower end of the B supply may be below ground, but this will be discussed hereinafter. The lead 14 is connected through condenser 37 to the grid 17 of the lower tube 18 of the series-connected pair. The tubes 18 and 19 are both triodes, as shown, with the upper plate 20 connected by way of conductor 21 to the positive end of the B supply 16, and the lower cathode 22 connected to ground.

The upper cathode 23 and the lower plate 24 are connected together at the juncture 25 from whence the load lead 26 extends to ground, with the load 11 and a series condenser 28 in the said lead.

The condition which gives rise to the degeneration in the top tube 19 arises by reason of the voltage which appears between the load junction 25 and ground. As far as the load 11 is concerned, and irrespective of the connection of the opposite end of the lead 26 (i. e., it need not be connected to ground, but may have other connections) the upper tube 19 is similar in action to a cathode follower which is inherently degenerative. Any voltage appearing between juncture 25 and ground will appear as well in the grid-cathode circuit of the upper tube unless compensated for or neutralized, as pointed out in the said co-pending application.

The signal from the previous source is also impressed directly upon the grid 30 of the inverter tube 31 which as noted is also a triode. In order to acquire such signal, a potentiometer 33 is connected from the conductor 14 to ground, and the slider 34 connected to the grid lead 35. The coupling condensers 36 and 37 are provided so that the proper negative bias voltages may be applied to grids 30 and 17 respectively.

The slider 34 is adjusted along the potentiometer 33 so that the signal component appearing at the plate 40 of the inverter tube 31, and hence that also appearing at the grid 41 of the top tube 19 is equal in amplitude to that appearing at the grid 17 of the lower tube 18.

The plate 40 drives the grid 41 by way of lead 42 through a coupling condenser 43. The tube 31 has a grid leak 73 and the cathode 44 has a biasing resistor 45 in its lead 46. Another resistor 47 is connected between the resistor 45 and ground, the purpose of which shortly will be explained. The lower tube 18 is biased by the bias supply 48 which is in series with the grid leak 49 and ground. The bias of the upper tube 19 is achieved through the grid leak resistor 50 which is connected between a pair of voltage dropping resistors 52 and 54 arranged in series across the B supply 16. The bias upon the upper tube 19 is thus equal to the voltage from juncture 25 to ground minus the voltage from juncture 56 and ground. The resistors 52 and 54 are chosen to give the desired negative bias.

The circuit as thus far described is substantially the same as that of the said co-pending application. Thus far, no means have been described for neutralizing the degeneration in the top tube 19. The invention lies especially in the means to be described for accomplishing this purpose, as well as in other features of the invention referred to hereinafter.

The plate 40 is supplied with a sensing signal that is derived from the juncture 25 between the tubes 18 and 19 and which signal appears from juncture 25 to ground. This is the same signal occurring across the load 11 and the condenser 28 in series. There is a conductor 57 between said juncture 25 and the plate 40, having a resistor 58 series-connected therein. Said resistor 58 functions as the plate load resistance of tube 31 and derives its positive D. C. operating potential from junction 25.

Disregarding for the moment the problem of properly and satisfactorily operating the lifter tube 31 at the most efficient conditions of its characteristics, the effect of applying the sensing signal obtained from the juncture 25 by way of the lead 57 through the plate resistor 58 is that the grid 41 of the top tube 19 is supplied with at least a part of such signal. The signal component derived from the input appearing at the plate 40 and that appearing at the juncture 25 are in phase. Because of this, less of the relatively high amplitude required by the grid 41 need be provided by the inverter tube 31.

As explained in the co-pending application, when neutralizing the degeneration which is characteristic of the top tube of the series-connected pair when same is driven from ground, the objective is to cause a voltage to appear at the grid of the top tube which is equivalent to the arithmetic sum of the voltage appearing from the cathode 23 to ground 15 and the signal voltage appearing across the input of the lower tube 18 from its grid 17 to ground. When this is accomplished the net voltage appearing from the grid 41 to the cathode 23 (the effective input signal of the top tube) is equal to that appearing across the input of the bottom of the series-connected tubes. In effect, the plate 40 of the lifter tube 31 is caused to follow whatever voltage appears at the output junction 25.

In the said co-pending application this was accomplished entirely by introducing a portion of the voltage sensed from across the output, i. e., secured from the juncture 25 between the series-connected tubes, into the cathode circuit of the lifter or inverter tube in such a manner that it appeared at the plate (equivalent to plate 40) in the same phase and magnitude as the voltage appearing at the cathode of the top tube. The signal from the previous stage was introduced into the grid-cathode circuit of the inverter tube.

Referring now to Fig. 1, it will be seen that the amount of sensing voltage acquired from the output juncture 25 which appears at the plate 40 due to the plate resistor 58 being tied to the juncture 25 through the lead 57 is a function of the impedance relationship of the resistor 58 to that of the entire plate circuit. In other words, there is an impedance divider, one branch of which is the resistor 58 and the other of which is the total impedance from the plate 40 through the plate circuit of the tube 31 to ground. When the impedance from the plate 40 to ground is many times the impedance of the resistor 58, then substantially all of the sensing voltage will appear at the plate 40 and consequently be available at the input of the top tube 19.

In the case of triodes the plate impedance is moderate, and as seen in Fig. 1 the tube 31 is illustrated as a triode. Under such circumstances, and unless other means are used, the resistance of the plate resistor 58 may be several times the total plate impedance of the tube 31 such that perhaps only one-half or one-third of the sensing voltage appearing at the juncture 25 will be available at the grid 41. This may be totally inadequate to obtain the kind of balanced operation desired and hence it may be essential to utilize some additional means to assure that the grid 41 obtains the major portion of the sensing voltage derived from the juncture 25 through resistor 58. This can be done by increasing the apparent plate resistance of the tube 31. One means is to add cathode degeneration by the insertion of a relatively large cathode resistor 47 in the lead 46 so that the total impedance from the plate 40 to ground is increased. This is a convenient method in the case the voltage gain of the output section is low. Another method of diminishing loading action of plate impedance of tube 31 is by the use of the broken line circuit 70, 71, 72, but this is the subject matter of my co-pending application, Serial No. 277,854.

Referring to the series-connected tubes 18 and 19, the maximum impedance of the tube 31 to ground is limited in Fig. 1 by the resistor 50. In some instances this effect may be small enough to be ignored, but in other instances its loading action may be offset by means described and clamed in said copending application, Serial No. 277,854.

In recapitulation, I have provided a circuit in which the sensing voltage from the juncture 25 is applied at the plate 40 through the plate resistor 58 to decrease the demands made on the tube 31, i. e., so that all that need be supplied thereby is a signal equal and opposite in phase to that appearing at the cathode 17 of the tube 18. This still provides the high amplitude signal required at the grid 41. In the case where the tube 31 is a triode having low plate impedance, I increase the effective plate resistance through the provision of cathode degeneration in a series cathode resistor 47. (Obviously I can use a tube with higher plate impedance, but this presently will be discussed.)

Figures 2, 3:
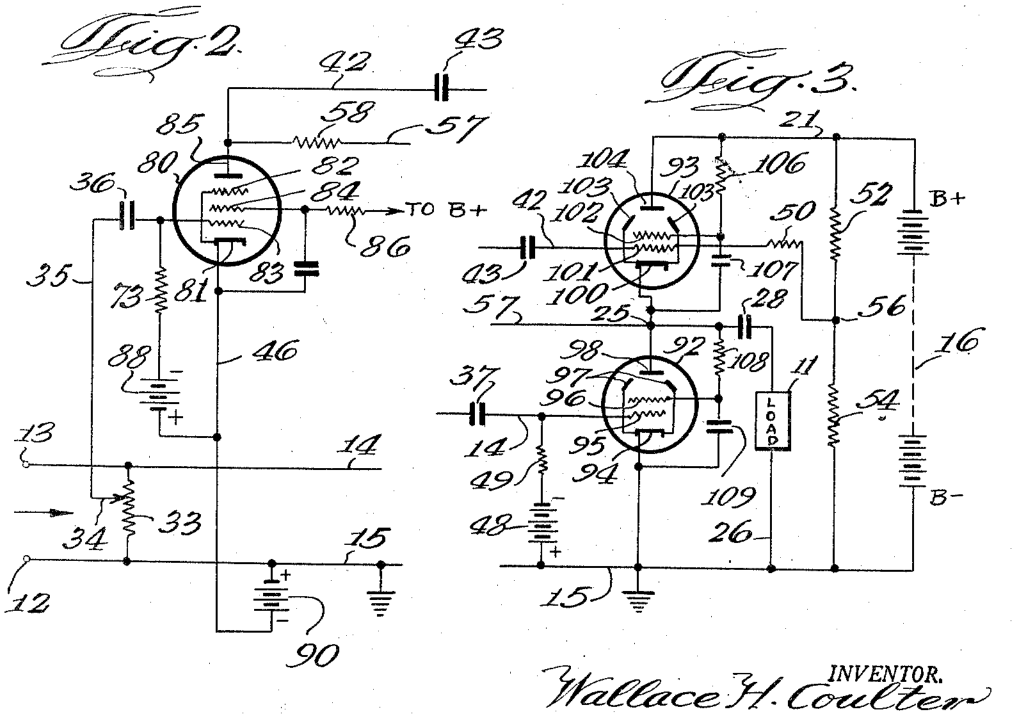
Fig. 2 is a circuit diagram showing the inverter or lifter portion of an amplifier constructed in accordance with my invention, the difference between the inverter portion of Fig. 1 and the illustration being that a screen grid tube is used in said Fig. 2.
Fig. 3 is a circuit diagram showing the output portion of an amplifier constructed in accordance with my invention, the difference between the output portion of Fig. 1 and the illustration being that screen grid tubes are used in said Fig. 3. Specifically, circuitry for feeding the screen grids of the tubes is illustrated.

In the circuit of Fig. 1 the inverter or lifter section was shown as a triode, and the attendant disadvantages of low plate resistance were pointed out. In Fig. 2 there is illustrated the inverter section of an amplifier which may be similar in every respect to that of Fig. 1 with the exception that the tube used is a pentode 80 having a cathode 81, connected with the suppressor grid 82, grid 83, screen grid 84, and plate 85. Lead 57 with series resistor 58, and lead 42 with blocking condenser 43 both connect to plate 85. The input to the tube 80 is the same as in the case of Fig. 1. The screen grid 84 is biased through a dropping resistor 86 from a suitable B supply and by-passed through condenser 87 to the cathode 81.

The plate resistance of a pentode is inherently very much higher than the plate resistance of a triode. In the event that pentodes (or other screen grid tubes) are used instead of triodes in the inverter section of the amplifier, it will not be necessary in many instances to use means for decreasing the loading effect of the tube 80 on the plate resistor 58. Specifically, it may not be required to use the cathode degeneration occasioned by a high cathode resistor (see 47 of Fig. 1) or other means.

Note in Fig. 2 that the bias for the grid 83 is obtained by means of a biasing battery 88 in series with a grid leak 73 to the cathode lead 46. In order to obtain sufficient plate potential for the tube 80, the cathode lead 46 is connected to a potential below ground as shown at 90. This, of course, may be a part of the B supply for the entire amplifier.

In connection with the use of cathode resistors in the inverter or lifter section it is pointed out that the operation as a lifter does not preclude the use of cathode resistors or other impedances for cathode compensation of low or high frequency plate circuit losses; or the use of the voltage drop across such a resistor to drive the bottom tube of the series-connected pair in which case the lifter section becomes the familiar split phase inverter.

In Fig. 3 I have illustrated a portion of another amplifier which is substantially the same as those described thus far except that the output is formed of screen grid tubes instead of triodes. I have illustrated a pair of series-connected beam-power amplifier tubes 92 and 93 arranged to provide the output. The lower tube has a cathode 94, grid 95, screen grid 96, deflectors 97 connected to the cathode, and the plate 98 connected to juncture 25. The upper tube 93 is similar, having cathode 100, grid 101, screen grid 102, deflectors 103 and plate 104 connected to lead 21. Cathode 100 is also connected to the juncture 25.

The beam-power tubes and conventional pentodes have an important advantage of increased plate efficiency. I have solved the problem of connecting the screen grid of the bottom tube in the manner described hereinafter. The upper screen grid 102 obtains its bias from the B supply lead 21 through a dropping resistor 106 and is by-passed by the capacitor 107 to the cathode 100. The lower screen grid 96 obtains its bias from the juncture 25 through the dropping resistor 108 and is by-passed by the capacitor 109 to cathode 94. Obviously the lower screen grid 96 is not connected to a B plus supply. Instead it is connected to the juncture between the two tubes and derives its voltage and current from juncture 25 which is at substantially half the potential across the two tubes, or half of the total B supply. Thus, the conditions under which resistor 106 and capacitor 107 are operating are the same as the conditions under which resistor 108 and capacitor 109 are operating.

The advantage of such an arrangement is that the plate and screen currents are more nearly balanced than if the bottom screen grid 96 were biased from the B plus lead 21 in the conventional manner through dropping resistors. In other words, the conventional method of biasing the screen grid 96 would cause the plate circuit of the lower tube to carry all the current, i. e., both plate and screen grid, of the upper tube, and hence be operating under different conditions therefrom.

The advantages of such operation of the output portion of the amplifier, i. e., through the use of screen grid tubes having the screen grids biased by means of voltage dropping resistors, are offset to some extent by virtue of the dissipation of energy in such resistors. Obviously this decreases the total power output of the amplifier. An alternative arrangement would be to substitute chokes for the resistors 106 and 108, and my invention contemplates such substitution. The use of chokes provides direct current paths which are not as dissipative of energy as resistive means.

Figure 4:
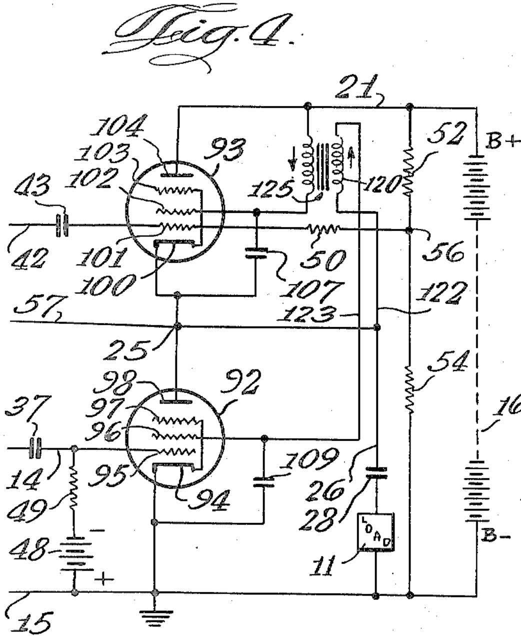
Fig. 4 is a circuit diagram of another modified form of the output portion of the amplifier, this time using pentodes. There is illustrated another method of feeding the screen grids of the tubes.

In Fig. 4 I have shown the output circuit of Fig. 3 in which the tubes 92 and 93 have been replaced by pentodes, which are not materially different as far as the circuit operation is concerned. Thus the same reference characters are used on the elements thereof.

The screen grids 96 and 102 of the tubes 92 and 93 respectively are here supplied through chokes 120 and 121 respectively. The choke 121 for the top tube 93 is connected to lead 21 which is at B plus potential as far as D. C. is concerned, but at ground potential as far as A. C. signal is concerned, and by-passed to the cathode through the capacitor 107. As for the choke 120 for the bottom screen grid 96, note that it is connected to the juncture 25 by way of the lead 122 and to the screen grid 96 by way of lead 123 which is by-passed by capacitor 109. Lead 123 is obviously at ground potential signal-wise. The two choke windings 120 and 121 each have the identical number of turns and are mounted on the same core to form a choke 125. The same ends of the chokes, the upper ends in the diagram, are arranged to be at signal ground, but as far as D. C. is concerned, the currents of the chokes are bucking. This can be ascertained by tracing the D. C. paths as indicated by the arrows.

In this manner the magnetizing effects of the D. C. screen currents substantially are bucked out with the result that a compact and economical dual choke may be used. There is no concern over the effects of magnetic saturation because of this arrangement.

The inverter or lifter section can be driven from the screen grid junction of the top tube of the arrangement illustrated in Fig. 4. The plate circuit of the lifter section under such circumstances would receive its positive supply voltage from the same winding 121 which supplies the screen 102. This connection is of course at the same output signal level as the junction 25 by virtue of the condenser 107 and is a convenient means of obtaining a higher D. C. operating voltage for the lifter section than by connecting the resistor 58 through lead 57 directly to the juncture 25. The only change from the previously described circuits is to connect the lead 57 at its right hand end to the screen grid 102 instead of to the juncture 25. It is not believed necessary to illustrate this change.

The plate current of the lifter tube flowing in the winding 121 tends to upset the direct current balance between the windings which has been described as desirable and advantageous. This may be offset by providing a pair of equal value resistors (not illustrated) one of which is connected across the screen condenser 109 while the other is connected from the output junction 25 to the lead 21, the positive side of the B supply 16. The resistors are selected to draw an amount of current equal to that drawn by the lifter tube.

Figure 5:
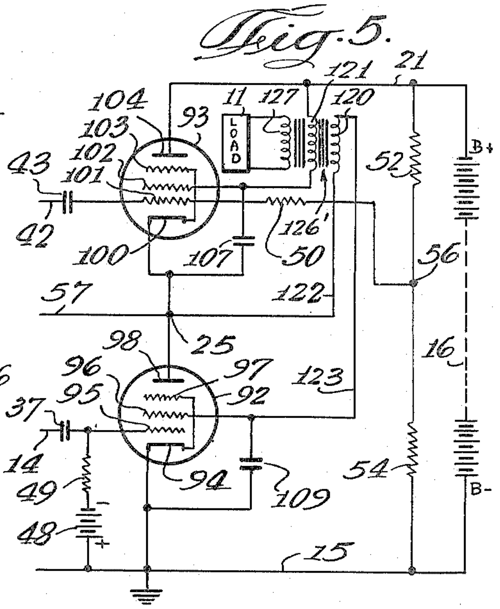
Fig. 5 is a circuit diagram similar to that of Fig. 4 but illustrating still another form of circuit for feeding the screen grids of the tubes.

In Fig. 4, the output circuit is illustrated as including a load 11 in the lead 26 which may be of any electrical nature desired. The manner of operation of such circuit has been explained herein and in the co-pending application. A variation of the connection to the load 11 is illustrated in Fig. 5, which is substantially identical to Fig. 4 in all other respects. The windings 120 and 121 are so associated that their magnetizing currents oppose one another as in Fig. 4.

Instead of a dual choke 125, there is illustrated a transformer 126 which has the two windings of the screen grid circuits and an additional winding 127. The load 11, instead of being connected in a lead which extends from juncture 25 to ground, is connected across the winding 127 and receives its signal from the screen windings, which now serve as the primary of transformer 126. This is an advantageous load arrangement because it provides flexible impedance matching.

The screen grid feed shown and described in connection with Figs. 4 and 5 is ideally suited for a highly economical arrangement for audio amplifiers. Instead of using a dual choke 125, or a transformer 126, the two windings 120 and 121 can comprise a split load, the parts of which are isolated from one another insofar as D. C. is concerned. Examples of such loads would be a dual wound voice coil of a speaker and a similarly constructed armature of a magnetic recording device. As in the arrangement described, the magnetizing currents in these cases are to be opposing to decrease their effects.

Figure 6:
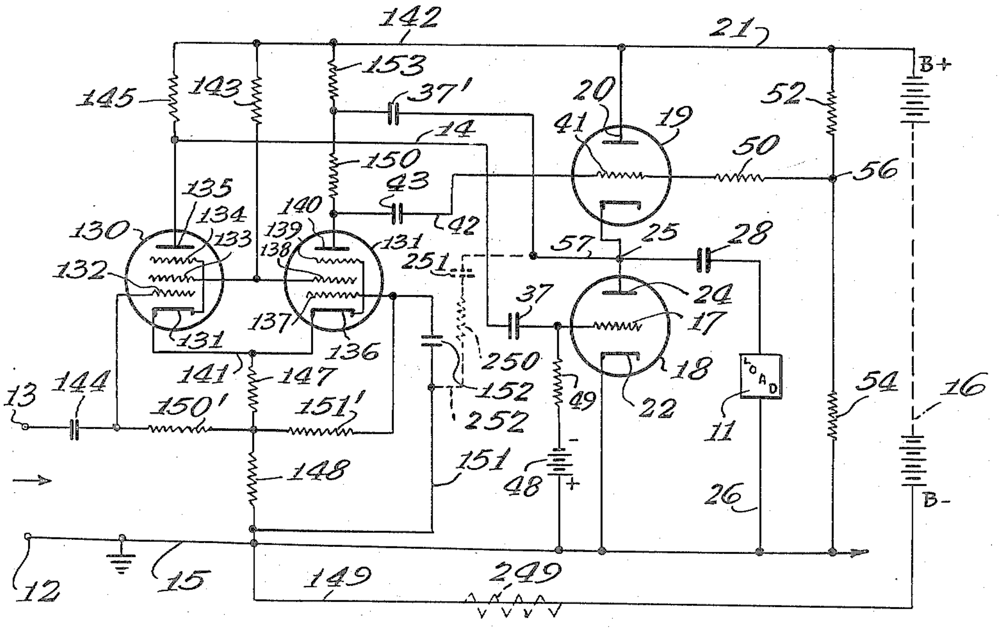
Fig. 6 is a circuit diagram of a modified form of amplifier in which the input comprises a cathode-coupled pair connected in a novel manner.

In Fig. 6 I have shown a modified form of the input section of the amplifier which supplies the inverted and the normal signals to the tubes 18 and 19. In this arrangement I use a cathode-coupled pair of tubes, which are here shown as pentodes 130 and 131. The left pentode 130 has a cathode 131', grid 132, screen grid 133, suppressor 134 connected to the cathode, and a plate 135. The right hand tube 131 is similarly constructed with cathode 136, grid 137, screen grid 138, suppressor 139, and plate 140. The cathodes 131' and 136 are connected together by lead 141 and the screens 133 and 138 are both biased from the B plus lead 142 (which connects with lead 21) through the common resistor 143.

The signal from the previous apparatus appears at the terminals 12 and 13 and is applied to the grid 132 through the coupling condenser 144. Signal current flows in the tube 130 and produces a drop across the plate resistor 145. The signal is then applied to the grid 17 of tube 18 through the lead 14 and the coupling condenser 37, the lead 14 being connected to the plate 135 of tube 130. The same signal current flows through the common resistors 147 and 148 in lead 149 thereby producing a voltage drop across these resistors. This serves to drive the second tube 131 through its cathode circuit, which is common to both tubes by reason of connection 141. The grid 137 of the second tube 131 is connected by lead 151 through a blocking condenser 152 to lead 149 across the cathode resistors 147 and 148. The resulting signal flowing in the plate circuits of the second tube 131 produces a voltage drop across the plate resistor 150. By proper choice of circuit components, especially considering the cathode resistors, the signal thus appearing across the plate resistor 150 can be caused to be substantially identical to the signal occuring across the plate resistor 145, but of opposite phase.

The sensing voltage previously discussed is introduced by way of lead 57 and blocking condenser 37' into the plate circuit of the tube 131 between resistors 150 and 153. The resistor 153 provides a D. C. path for the plate current of tube 131 and is a means of providing the top end of plate resistor 150 with a higher D. C. potential than appears at the junction. Although dissipative of power since it is in effect across the load, its resistance is large compared with the load impedance and power loss therein is very low. The condenser 37' serves effectively to tie the resistor 150 to the junction insofar as signal components are concerned.

The tube 131 and previous tubes 31, 80 have been described as lifters because the plate resistors operate at a level above ground and each is independent of any voltage occuring between that level and ground. I have provided a means whereby the proper signal for the operation of the top tube 19 is economically and conveniently obtained, in a manner not heretofore disclosed or known in the prior art.

Note that the cathode resistors must have values such as to provide adequate coupling for balanced operation of the tubes 130 and 131. They are connected in the lead 149 which, instead of being connected to ground 15 is connected below ground as in the case of the circuit of Fig. 2 to provide greater total plate operating voltage to accommodate the added resistor drops.

The circuit of Fig. 6 which utilizes the cathode coupled tubes 130 and 131 has an added advantage which augments the fidelity achieved by virtue of using balanced output principally in the case that the output of the amplifier is feeding loads whose impedance is lower than the ordinary. In the use of series-connected pairs, or push-pull arrangements, it is known that the even harmonics are balanced so that greater fidelity is obtained. When the impedance of the load drops below some range there occurs a peaking of the signal wave form which destroys fidelity and which is caused by odd harmonics. The lifter circuit described can be adjusted to provide rounded top signals to the series-connected pair to compensate for the peaking due to low impedance loads. This is described in considerable detail in said co-pending application Serial No. 277,854, but suffice it to say here, that it is done by driving the tubes of the cathode coupled pair hard. This results in ability to drive lower impedance load, reduction of harmonics, and many additional advantages.

There are many important advantages in being able to achieve such distortionless operation into low impedance loads. For example, in voice coils of speakers, the space available for wire is at a premium. The frequency response of the speaker depends upon the ability of the voice coil to vibrate readily, and low mass cannot be achieved with a large amount of wire which would be required if the load impedance had to be high. The prior practice in compromising for the two factors—low mass and high impedance—has been to wind voice coils with very fine wire. This of course is not economical. By the use of my amplifier very small voice coils can be made with low impedance and fewer turns.

It should be pointed out that by means of the balanced operation of the series-connected pair as achieved when the degeneration of the top tube is neutralized as described herein, not only are all of the advantages set forth above made possible, but furthermore the coupling of the load with the amplifier need not be accomplished by the use of expensive transformers. One may also consider an additional economy in the overall picture by realizing that the previous stage has its signal coupled to the amplifier herein described also without a transformer.

The apparatus of the invention can utilize the advantages inherent in inverse feedback well-known in the art. It has been deemed unnecessary to show the exact manner of such application in order to keep the description and drawings simple. One convenient method is to utilize the cathode-coupled pair of tubes 130 and 131 of Fig. 6 and is illustrated by broken lines. A resistor is added in lead 149 below resistor 148. This is shown at 249. A feedback path 252 which will usually comprise a resistor 250 in series with a blocking condenser 251 is provided between output junction 25 and lead 151. It will be noted that the feedback voltage appearing across resistor 249 is applied in the grid-cathode circuit of the input tube 130 and is not in anywise directly fed into the grid-cathode circuit of tube 131. The feedback components applied to tube 130 are coupled into the grid-cathode circuit of tube 131 by virtue of the common resistors 147 and 148. This arrangement is preferable to negative feedback into the grid circuit of tube 131 as would be accomplished conventionally by disconnecting lead 151 from below resistor 148 and connecting it across a part or all of the output of the series-connected pair.

It is believed that the invention has sufficiently been set forth in detail such as to enable one skilled in the art to which same appertains to make, construct and use the same. It is again emphasized that theoretical explanations are by way of assisting in an understanding of the invention in all of its phases and not by way of limitation.

Although the schematic circuit diagrams and the specification are deemed sufficient to enable one to construct the devices therein described, some comparative values of the components for practical examples are believed of assistance.

In Fig. 1 the lifter section could be constructed about a 6C4 tube (31) or better yet, one with a higher amplification factor such as for example a section of the dual triode tube 12AX7. The plate resistor 58, the grid resistor 73 and the cathode bias resistor 45 are convenient typical resistors for resistance coupled stages. The degenerative resistor 47 may range in value from a fraction of the resistance of the plate resistor 58 up to about equal resistance. In order to obtain enough voltage output from the tube 31 to drive the tube 19 to full output it may be necessary to connect the bottom end of the resistor 47 to a source of negative potential to obtain sufficient operating potential to supply the voltage drops across the tube 31 and the resistors 58, 45 and 47. This is shown in later figures.

The resistor 72 will be dependent upon the values of the resistors 58, 45 and 47 and upon the operating characteristics of the particular tube chosen for tube 31. Typical values will be found in the manufacturers specifications for such tubes.

Tubes 18 and 19 may be low mu power tubes. The 6AS7–G dual triode is excellent as the output pair because of its low plate impedance. The output coupling condenser 28 will usually be an electrolytic unit of from 30 to 120 microfarads for audio applications. The supply voltage source 16, when a 6AS7–G is used, may be conveniently obtained from an economical transformerless voltage doubler type of rectifier which has an output of 250 to 260 volts D. C. when used with a 117 volts main supply.

The values of the circuit components of Fig. 2 are also typical values used in resistance coupled stages. The tube 80 may be a type 6AU6.

In Fig. 3 the tubes 92 and 93 may be beam power tubes such as type 6L6. Power output of the arrangement may be limited by reason of poor voltage regulation of the D. C. screen grid voltage as a result of the use of the voltage dropping resistors 106 and 108. The arrangement of Fig. 4 is much preferred in this respect.

In Fig. 4 the D. C. resistance of each winding of the dual choke 125 may be conveniently kept to no more than a few hundred ohms. As for the tubes of Fig. 4, an excellent arrangement is to use a pair of tubes in the place of each tube 92 and 93 designated in the diagram. A 6L6 with its sections paralleled would suffice in conjunction with a plate supply 16, of 600 volts. The power output, without exceeding either the plate or screen grid ratings is 50 watts operating into a 500 ohm load with low distortion and excellent efficiency.

In Fig. 6 the tubes 130 and 131 may be of the type 6AU6 or 6CB6 and the tubes 18 and 19 may again be 6AS7–G's. Excellent performance is obtained operating into a 150 ohm load. The plate resistors 145 and 150 are usually identical and are chosen so that the D. C. voltage drop across them is only moderately higher than the peak signal voltage that is to be produced across them.

The artisan will appreciate that the comments made above point out the manner in which the values of the circuit components will easily be obtained with a minimum of effort. There necessarily will be wide ranges to suit the purposes and requirements of the amplifier. As for loads, these may consist of various types of speakers, electro-magnetic devices, and the like and their impedances may vary widely.

What it is desired to secure by Letters Patent of the United States is:

1. An amplifier circuit for driving a load, comprising a first tube, a second tube, and a third tube, each tube having at least a plate, a grid and a cathode, the cathode of the first tube and the plate of the second tube being connected to provide a common A. C. point, and a source of D. C. plate potential connected across the first and second tubes from the plate of the first tube to the cathode of the second tube, the first and second tubes thereby comprising a series-connected pair, a load coupled between said common A. C. point and ground to be driven by the output of the amplifier circuit, said third tube comprising a signal inverter stage, a signal input source, a first connection from the signal input source through the inverter stage to the grid of said first tube and applying to said last mentioned grid a signal with respect to ground thereby causing a voltage to appear across the load to ground which is in negative feedback relation to the applied signal insofar as the grid-cathode circuit of the first tube is concerned, a second connection from said signal input source to the grid of the second tube and applying thereto a signal with respect to ground in phase opposition to the signal applied at the grid of said first tube, a feedback path from said common A. C. point and extending to the first connection at the plate of said third tube and said feedback path including a series impedance therein in common with and serving as the plate impedance of said third tube, to apply to the first tube a signal augmenting the amplitude of that derived from said signal source so that the negative feedback affecting said first tube is opposed.

2. An amplifier circuit for driving a load, said circuit including a pair of series-connected tubes comprising a first tube and a second tube for providing substantially balanced output for said load, the tubes each having at least a cathode, grid and plate, the cathode of the first tube and the plate of the second tube being joined at least signal-wise and forming thereby a load connecting juncture, the load is connected between said juncture and ground, and a potential source is connected between the plate of the first tube and the cathode of the second tube, means providing a signal from a prior source to said amplifier circuit comprising a two-conductor signal input, one conductor being grounded, and the second conductor being at signal potential above ground, an input stage including a third tube having at least a plate, cathode and grid, with the plate connected to the grid of one of said first and second tubes, and having the cathode of said third tube connected to ground and the grid of the third tube connected to the second conductor to have the signal at the input applied thereto with identical phase, and at least a substantial portion of the same amplitude, a feedback connection between the juncture and the plate of the third tube having a plate load impedance for the third tube in series therein, the second conductor also being connected to the grid of the other of said first and second tubes to apply a signal thereto of the same phase and at least a substantial part of the amplitude of the input signal between said grid and ground, the amount and character of feedback being such as to provide substantially equal amplitude and opposite phase signals at the grids of said first and second tubes, and thereby offset the degeneration inherent in the first tube.

3. An amplifier circuit as claimed in claim 2 in which means are provided to add cathode degeneration to the third tube to increase the apparent plate resistance thereof.

4. An amplifier circuit as claimed in claim 2 in which the said third tube is a triode, means are provided for biasing the grid of said third tube, and means are provided for adding cathode degeneration to increase the apparent plate resistance of said third tube comprising a relatively high cathode resistor in addition to said biasing means.

References Cited in the file of this patent

UNITED STATES PATENTS

| | | |
|---|---|---|
| 2,424,893 | Mansford | July 29, 1947 |
| 2,700,704 | Minter, 2nd | Jan. 25, 1955 |

FOREIGN PATENTS

| | | |
|---|---|---|
| 559,078 | Great Britain | Feb. 3, 1944 |